United States Patent
Cumoli et al.

(10) Patent No.: US 10,372,958 B2
(45) Date of Patent: Aug. 6, 2019

(54) IN-FIELD DATA ACQUISITION AND FORMATTING

(71) Applicant: DATALOGIC IP TECH S.R.L., Monte San Pietro, Bologna (IT)

(72) Inventors: Marco Cumoli, Monte San Pietro (IT); Francesco D'Ercoli, Bologna (IT)

(73) Assignee: Datalogic IP Tech S.r.l., Lippo di Calderara di (IT)

( * ) Notice: Subject to any disclaimer, the term of this patent is extended or adjusted under 35 U.S.C. 154(b) by 0 days.

(21) Appl. No.: 15/370,701

(22) Filed: Dec. 6, 2016

(65) Prior Publication Data
US 2018/0157883 A1  Jun. 7, 2018

(51) Int. Cl.
| | | |
|---|---|---|
| *G06K 7/10* | (2006.01) | |
| *G06K 7/14* | (2006.01) | |
| *G06K 19/06* | (2006.01) | |
| *G06F 17/30* | (2006.01) | |
| *G06K 9/00* | (2006.01) | |
| *G06K 9/03* | (2006.01) | |

(52) U.S. Cl.
CPC ..... *G06K 7/1447* (2013.01); *G06F 17/30879* (2013.01); *G06K 7/10732* (2013.01); *G06K 7/14* (2013.01); *G06K 7/1413* (2013.01); *G06K 9/00979* (2013.01); *G06K 9/036* (2013.01); *G06K 19/06009* (2013.01); *G06K 19/06028* (2013.01)

(58) Field of Classification Search
CPC ... G06K 7/10851; G06K 7/10861; G06K 7/14
USPC .......................... 235/462.01, 462.25, 472.01
See application file for complete search history.

(56) References Cited

U.S. PATENT DOCUMENTS

| | | | |
|---|---|---|---|
| 5,837,983 A | 11/1998 | Actis et al. | |
| 6,050,731 A | 4/2000 | Matsui | |
| 7,827,122 B1 | 11/2010 | Campbell et al. | |
| 7,962,440 B2 | 6/2011 | Baier et al. | |

(Continued)

FOREIGN PATENT DOCUMENTS

WO  2005124657 A1  12/2005

OTHER PUBLICATIONS

Extended Search Report dated May 9, 2018 in European Patent Application No. 17205600.4, 8 pages.

(Continued)

*Primary Examiner* — Jamara Franklin
(74) *Attorney, Agent, or Firm* — Shook, Hardy & Bacon LLP

(57) ABSTRACT

Systems, methods, and computer-readable storage media are provided for acquiring field device data (e.g., imaging data such as barcode readings), extracting patterns from the field device data, and formatting the extracted patterns—all directly from field devices (e.g., barcode readers) embedded with these capabilities. The information conveyed by the patterns extracted at the devices embedded with these capabilities may be synthesized and shown in a graphical way to end-users, for instance, by exploiting IoT middleware platform services available at end-user side. Accordingly, systems, methods and computer-readable storage media in accordance with embodiments hereof further provide a customized visualization (e.g., a widget) aimed to make the formatted patterns available in an easy, intuitive and effective way.

24 Claims, 9 Drawing Sheets

(56) References Cited

U.S. PATENT DOCUMENTS

| | | | |
|---|---|---|---|
| 8,196,832 B2* | 6/2012 | Soule, III | G06F 8/63 |
| | | | 235/454 |
| 8,442,933 B2 | 5/2013 | Baier et al. | |
| 8,533,619 B2 | 9/2013 | Baier et al. | |
| 8,805,760 B2 | 8/2014 | Baier et al. | |
| 9,253,054 B2 | 2/2016 | Maturana et al. | |
| 9,438,648 B2 | 9/2016 | Asenjo et al. | |
| 2002/0102966 A1 | 8/2002 | Lev et al. | |
| 2002/0190127 A1 | 12/2002 | Davis et al. | |
| 2013/0256409 A1 | 10/2013 | Reed et al. | |

OTHER PUBLICATIONS

Extended Search Report in European application No. 17205617.8-1202 dated May 16, 2018, 5 pages.
Notice of Allowance dated Jan. 31, 2019 in U.S. Appl. No. 15/370,709, 8 pages.

* cited by examiner

IN-FIELD DATA ACQUISITION AND FORMATTING

CROSS-REFERENCE TO RELATED APPLICATIONS

This application is related by subject matter to U.S. patent application Ser. No. 15/370,706, entitled "Barcode Signal Reconstruction Utilizing Sequence Alignment Matrices", and U.S. patent application Ser. No. 15/370,709, entitled "Predictive Anomaly Detection", both of which share the same filing date as the present application and both of which are incorporated herein by reference in the entirety.

BACKGROUND

PC-based industrial automation, human-machine interfaces ("HMIs") and Supervisory Control and Data Acquisition ("SCADA") capabilities have been industry standard since the 1980s, allowing suppliers to build products to run on relatively stable target platforms, and allowing their customers to use familiar operating systems for industrial automation applications. Traditionally, remote access to these HMI/SCADA offerings has presented several challenges but more recently it is common for users to be able to quickly and easily create "dashboard screens" (e.g., summary screens, etc.) for remote viewing on multiple devices, for instance, PCs, tablets, smartphones, and the like. These screens generally are capable of being viewed using any web browser that supports HTML5 (or other/latest HTML versions), an industry-standard markup language used for structuring and presenting content via the Internet and the web.

With HTML5 (or other/latest HTML versions) technology, HMI/SCADA capabilities allow users to create and maintain remote viewing screens compatible with most tablets or smartphones, without a great deal of custom programming or software maintenance hassle on the SCADA-side due to updates to remote viewing capabilities of a device's hardware or firmware. Moreover, large sets of data coming in from the field can be filtered, collected and analyzed appropriately in order to extract the real-time knowledge (e.g., trends, patterns, and the like) that can be valuable to the end user/customer.

In the Smart Factory scenario, manufacturers of sensor devices, including Auto ID and vision systems, are increasingly taking advantage of the technology and potential offered by the Internet of Things ("IoT") middleware solutions already available in the factory automation field. Designing, implementing and selling new, effective data mining tools (along with proper visualization capabilities (e.g., widgets)) is increasingly become necessary for companies that want to remain competitive in the IoT Digital Age. Additionally, in today's Factory Automation scenarios, when data mining engines are available, they are generally Cloud-based and not practically accessible directly from field devices (for instance, due to issues such as complexity, bandwidth, data security/confidentiality, expense, and the like).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for effectively deploying data mining algorithms, intended as a set of heuristics and calculations that create a data mining model for data coming in from the field (e.g., a factory automation field), in an embedded system (e.g., vision system and sensor clusters) by exploiting IoT middleware platforms available at end-user side. The tool consists of an embedded data mining tool combined with a remote client widget (or other visualization tool), that equip an industrial barcode reader device (e.g., a 2D vision sensor) with powerful analytics features consisting of, just as two possible cases, an "ease of (barcode) reading" feeling and Advanced Label Recognition ("ALR") for the end customer, anytime and everywhere.

Systems, methods, and computer-readable storage media in accordance with embodiments of the present invention acquire field device data (e.g., imaging data such as barcode readings), extract patterns from the data, and format the extracted patterns directly from field devices (e.g., barcode readers) embedded with these capabilities. The information conveyed by the patterns extracted at the devices embedded with these capabilities may be synthesized and shown in a graphical way to end-users, for instance, by exploiting IoT middleware platform services available at end-user side. Accordingly, systems, methods and computer-readable storage media in accordance with embodiments hereof further provide a customized widget aimed to make the formatted patterns available in an easy, intuitive and effective way.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
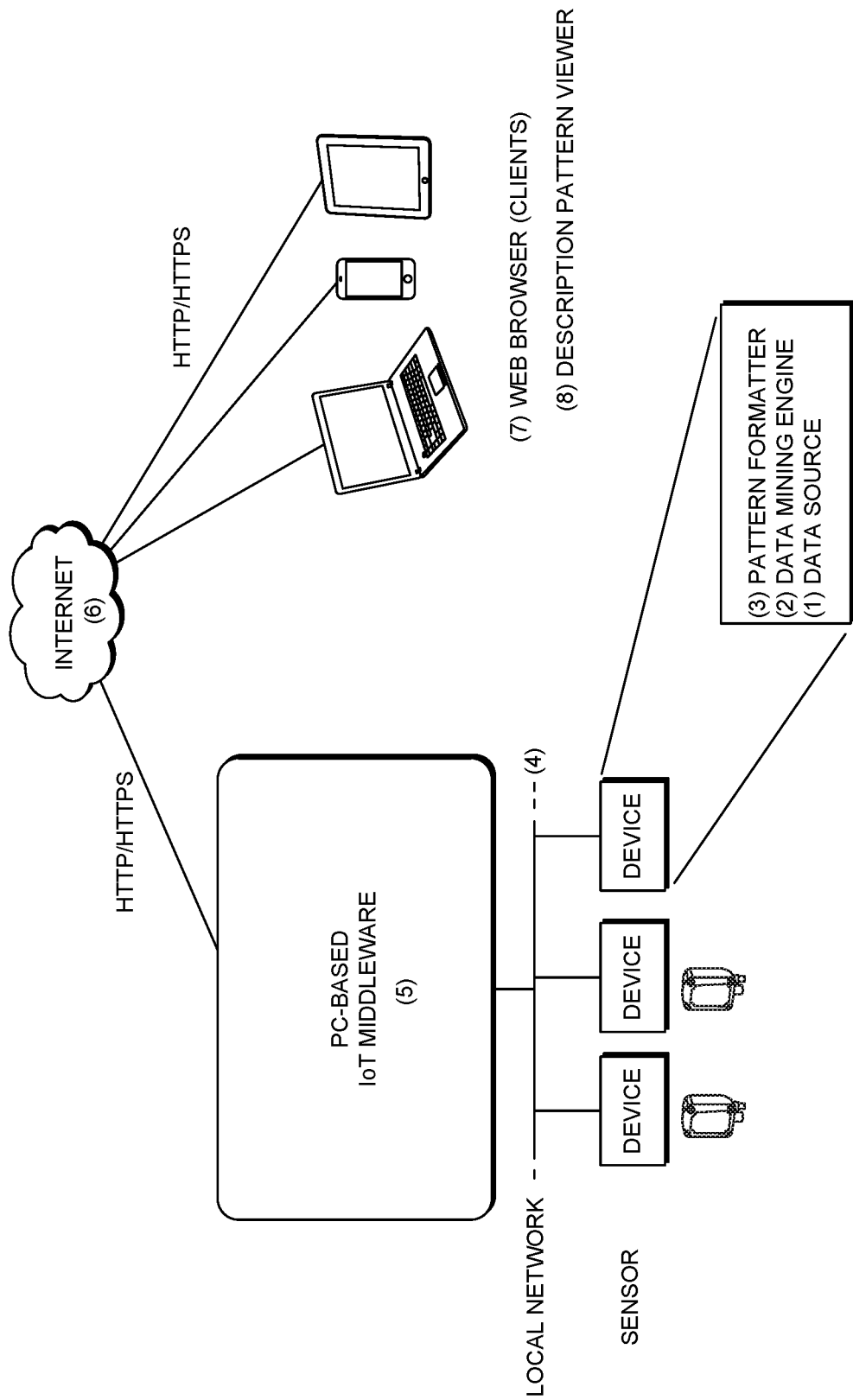
FIG. 1 is a schematic diagram showing an exemplary computing environment in which embodiments of the present invention may be implemented.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for acquiring field device data (e.g., imaging data such as barcode readings), extracting patterns from the field device data, and formatting the extracted patterns—all directly from field devices (e.g., barcode readers) embedded with these capabilities. The information conveyed by the patterns extracted at the devices embedded with these capabilities may be synthesized and shown in a graphical way to end-users, for instance, by exploiting IoT middleware platform services available at end-user side. Accordingly, systems, methods and computer-readable storage media in accordance with embodiments hereof further provide a customized visualization (e.g., a widget) aimed to make the formatted patterns available in an easy, intuitive and effective way.

Accordingly, exemplary embodiments are directed to methods being performed by one or more computing devices including at least one processor, the methods for on-field data acquisition and formatting. An exemplary method comprises acquiring, at a field device, field device data; extracting, at the field device, at least one pattern from the field device data; and formatting, at the field device, the at least one pattern to create at least one formatted pattern that is capable of being transmitted over a local network.

Other exemplary embodiments are directed to sensors for on-field data acquisition and formatting. An exemplary sensor comprises an embedded data acquiring component configured for acquiring sensor data; an embedded data mining component configured for extracting at least one pattern from the sensor data; and an embedded data formatting component configured for formatting the at least one pattern to create at least one formatted pattern that is capable of being transmitted over a local network.

Yet other exemplary embodiments are directed to imaging sensors for on-field data acquisition and formatting. An exemplary imaging sensor comprises: (a) an embedded data acquiring component configured for acquiring, at the imaging sensor, a plurality of imaging data points; (b) an embedded data extracting component configured for extracting, at the imaging sensor, at least one pattern from the plurality of imaging data points by: (1) measuring at least one attribute pattern from the plurality of imaging data points; (2) comparing the measured at least one attribute pattern to a plurality of training data patterns; and (3) based on the comparing, classifying the measured at least one attribute pattern as a predefined class-attribute pattern; and (c) an embedded data formatting component configured for formatting, at the imaging sensor, the at least one classified class-attribute pattern to create at least one formatted pattern that is capable of being transmitted over a local network.

Systems and method in accordance with embodiments of the present invention combine available IoT middleware approaches with embedded real-time analytics in order to provide simple, direct, and remote visual knowledge to end-users without needing a Cloud-based approach (which could be disadvantageous in terms of complexity, cost, and confidentiality/knowledge of data, etc.). With reference to FIG. 1, a schematic diagram showing an exemplary computing environment and method in which embodiments of the present invention may be implemented is illustrated. The diagram of FIG. 1 illustrated (1) an embedded data source, (2) an embedded data mining engine, (3) an embedded pattern formatter, (4) a local network, (5) IoT middleware, (6) the Internet, (7) (client) web browsers, and (8) a description pattern viewer.

The embedded data source (1) includes the hardware and the software dedicated to acquire field device sensor (e.g., imaging sensor or barcode reader) data from the sensor. In embodiments, data selection and cleaning may (but do not need to) lead to a great volume of data for processing.

The data mining engine (2) includes one more algorithms as a set of heuristics and calculations that create a data mining model for data coming from the sensor. In embodiments, data mining takes its inspiration from the areas of machine learning/artificial intelligence, pattern recognition, statistics, and databases where traditional analysis techniques may be unfit for various reasons including, but not limited to, volume of data, high-dimensionality of data, and heterogeneity of data.

Exemplary common output patterns for the data mining engine include, without limitation association rules, classifiers, decision trees, clustering, and time series analysis. Association rules help determine the rule of logical implication present in a database, and then to identify the groups of affinity between objects. Classifiers allow derivation of models for the classification of data according to a set of classes assigned a priori. Decision trees are special classifiers that identify, in order of importance, the causes that lead to the occurrence of an event. Clustering involves grouping elements of a set, depending on their characteristics. With clustering, classes are not assigned a priori. Time series analysis allows the detection of recurrent patterns or atypical sequences in complex data. It will be understood and appreciated by those having ordinary skill in the art that the described output patterns are exemplary only and are not meant to limit the scope of embodiments of the present invention.

In embodiments, patterns extracted as the output of the data mining engine (2) need to be formatted (e.g., coded, compressed, encrypted) in order to be transmitted on the local network. This is the function of the pattern formatter (3). As utilized herein, a "pattern" may be described as a synthetic representation and rich semantics of a set of data. In general, a pattern will express a recurrent pattern in the data, but can also express an exceptional model. A pattern is valid on the data with a certain degree of confidence, understandable in terms of syntax and semantics, previously unknown and, in some instances, potentially useful for the user to take appropriate action.

As illustrated in FIG. 1, the local network (4) is typically a fieldbus (e.g., Profinet, I/O, Ethernet/IP) or a standard IEEE 802.34 local area network, accessible only within a local IT environment and not directly from the web. The IoT middleware (5) represents the specialized software visual programming environment included in the SCADA PC system. The Internet (6) is the well-known HTTP/HTTPS/TCP/IP based network infrastructure and protocol suite. Client web browsers (7) are client-side applications (e.g., IE®, Chrome®, Safari®, etc.) that are capable of downloading and interpreting HTML-based web pages coming from the server located in the IoT middleware. Client devices where web browsers can run include, without limitation, laptops, tablets, smartphones, and the like. The description pattern viewer (8) may include any remote viewer widget (or other visualization capability) interpreted by any web browser supporting HTML5 (or other/latest HTML versions).

An embedded tool as illustrated and described with reference to FIG. 1, provides a formatted pattern from the data mining process that is ready to be transferred through the network and rendered on a client device (e.g., web browser). In accordance with embodiments hereof, the visualization capability (e.g., widget) may be strictly customized on the specific data mining output pattern.

Embodiments of the present invention provide an automatic, self-learning analytic tool capable of explicitly, anytime and anywhere, rendering barcodes (or other field device and/or imaging or sensor data) easy for users to read and/or decipher. Proposed tools, in accordance with embodiments hereof, classify, in a real-time fashion, the "ease of reading," on the field (that is, indicate how easy data is to read or decipher) for a general case and then illustrate this information at a remote client environment where it is readily discernible by the end-user. Methods in accordance with embodiments hereof may be considered a pure-visual, web-based, barcode quality grading method and may be achieved by assigning each and every barcode reading effort of a field device to one of three class attributes: easy to read, normal effort required to read, or hard to read.

As is typical with predictive analytics, in accordance with embodiments of the present invention, some variables are utilized to predict the unknown future value of other variables. The key is to discover, through training (for a "learn classifier") a model for class attributes that can express the value of a (predicted attribute) as a function of the values of other attributes. At design-time, a collection of records is given for training purposes (a "training set") and another is used to determine the accuracy of the model (a "test set"). Each record is composed of a set of attributes, one of which will express the attribute class to which the record is to be classified.

Figure 2:
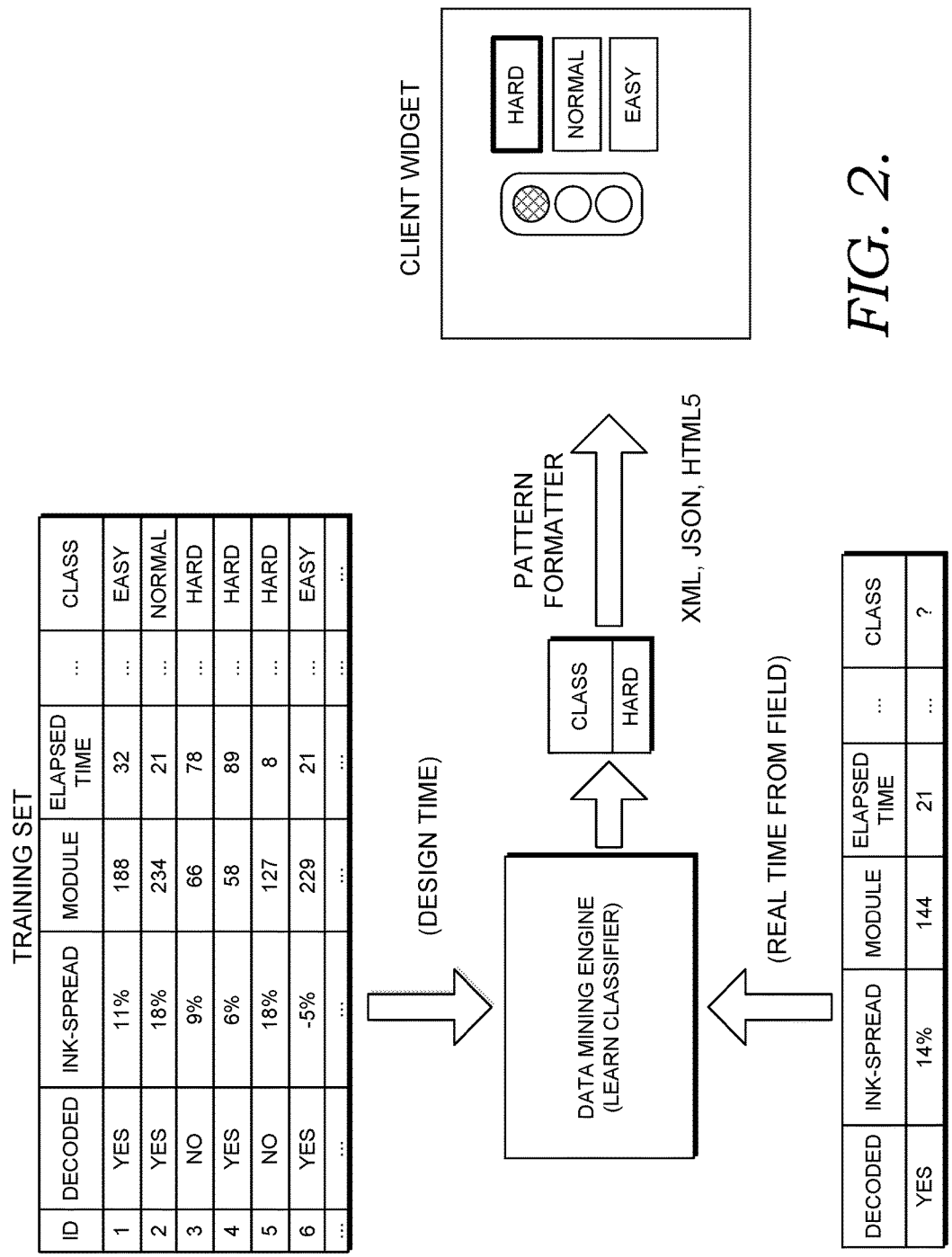
FIG. 2 is a schematic diagram showing an exemplary method in accordance with embodiments of the present invention, wherein a read and formatted label is determined to be hard to read.

At run time, attributes (which may be categorical or continuous in regard to their values) are measured and used as an input for the data mining engine (see (2) of FIG. 2). The goal is that previously unseen records may be assigned to a class as accurately as possible, formatted (e.g., utilizing XML or JSON) and, through a standard HTML5 (or other/latest HTML versions) widget, shown to the end-user.

By way of example, FIG. 2 illustrates a schematic diagram showing an exemplary method in accordance with embodiments of the present invention, wherein a read and formatted label is determined, through the system and method described in FIG. 1, to be hard to read.

In many applications having occasion to utilize systems and methods in accordance with embodiments of the present invention, for instance, transportation and logistics applications, for example, barcode labels appear very similar if not substantially identical from one carrier or item tracking system to another. By way of example only, DHL, UPS, FEDEX and SDA labels all appear very similar to one another. In many applications where such similarity is routine, a lot of data and information included in the barcode symbol labels is disregarded and focus is, instead, placed only on those obviously distinguishing characteristics. In this way, each and every label read is essentially read from scratch without data retention of recurrent characteristics. A number of codes and their typology are set up and the output result is one of a limited range: good/complete read (if all expected codes have been read without duplications), multiple read (if more different codes than expected have been read), partial read (if less than the expected number of codes have been read, but almost one), and no read (if no codes have been read). In such a scenario, much more information is available that could be utilized to enhance a read quality result. Such information includes, without limitation, spatial coordinates of the codes related to the label, spatial coordinates of the codes related to other codes, code orientation compared to the label orientation and/or the other code orientations, and number of characters of each read code related to the code position inside a barcode symbol label, correlations between code content, code symbology, code position, code length, etc.

Systems and methods in accordance with embodiments of the present invention may be utilized to extract the recurring label characteristics, allowing end users an enhanced set of information to aid in data analysis, all of it easily useable through a simple and immediate visualization capability (e.g., a widget). For instance, systems and methods of the present invention may provide end users with a confidence indicator for the output result; an auto-recognition of false positive occurrences; recovery from some multiple-read situations; in the case of a partial read or no read condition, it may be possible to provide indications for the no read codes such as: typology, number of characters, positions (with a specific ROI useable for video coding purposes, if necessary); and detection of any reader set up issues, e.g., a reader that always loses a specific code in a specific position, a truncation, reflection, dust, some obstacle, on the optical path, etc.

Figure 3:
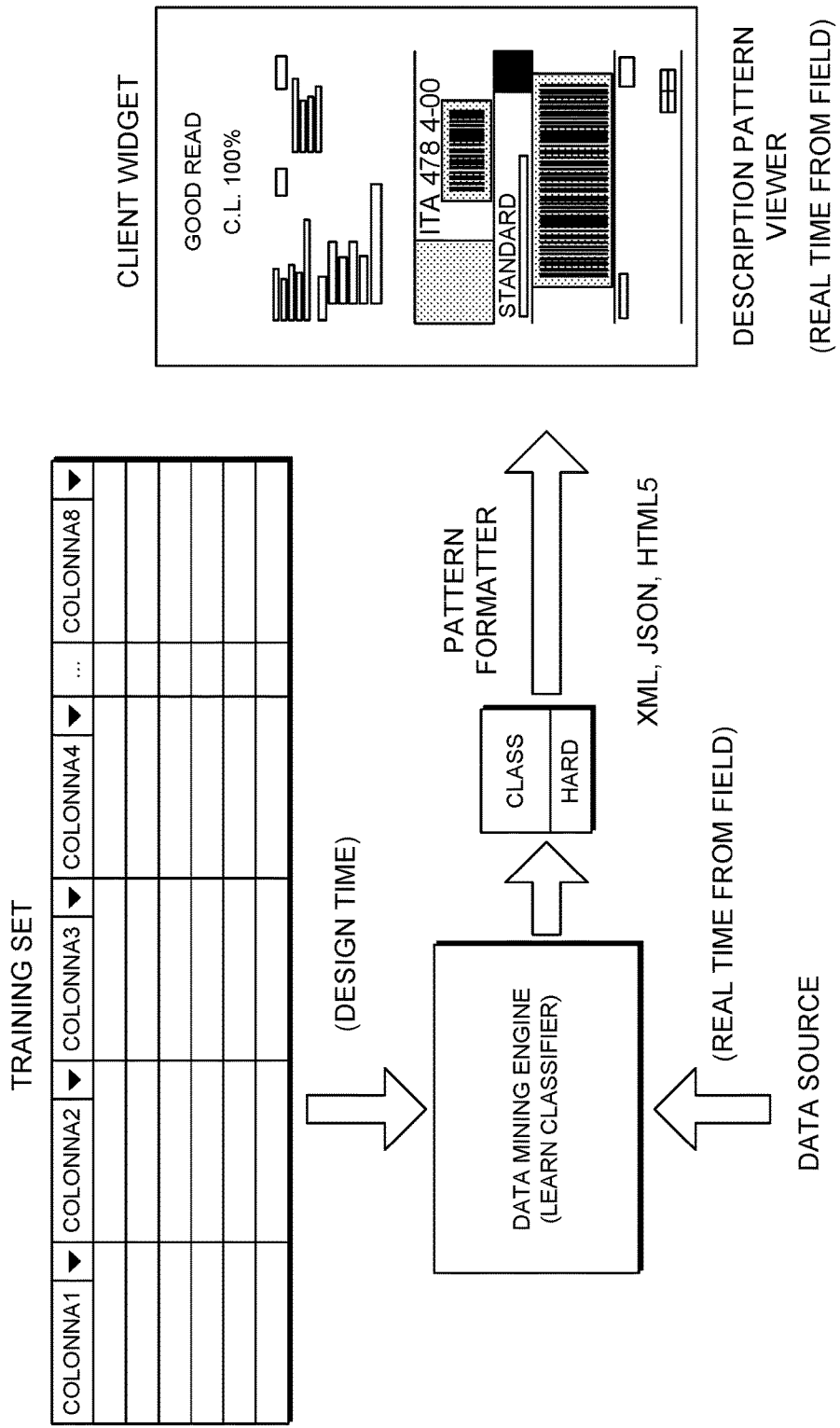
FIG. 3 is a schematic diagram showing an exemplary method in accordance with embodiments of the present invention, wherein a read and formatted label is determined with a single read to be a good read with a confidence indicator of 100%.

FIGS. 3-6 illustrate reading classifications having enhanced information, in accordance with embodiments of the present invention. FIG. 3 illustrates a schematic diagram showing an exemplary method in accordance with embodiments of the present invention, wherein a read and formatted label is determined with a single read to be a good read with a confidence indicator of 100%. In embodiments, the appropriate read portions of the label may be indicated in one color (e.g., green) while other portions that may not have been read as expected may be alternately shown as another color (e.g., orange indicating read but not expected and red indicating unable to be read). Any and all such variations in indications of additional information may be utilized in accordance with embodiments of the present invention.

Figure 4:
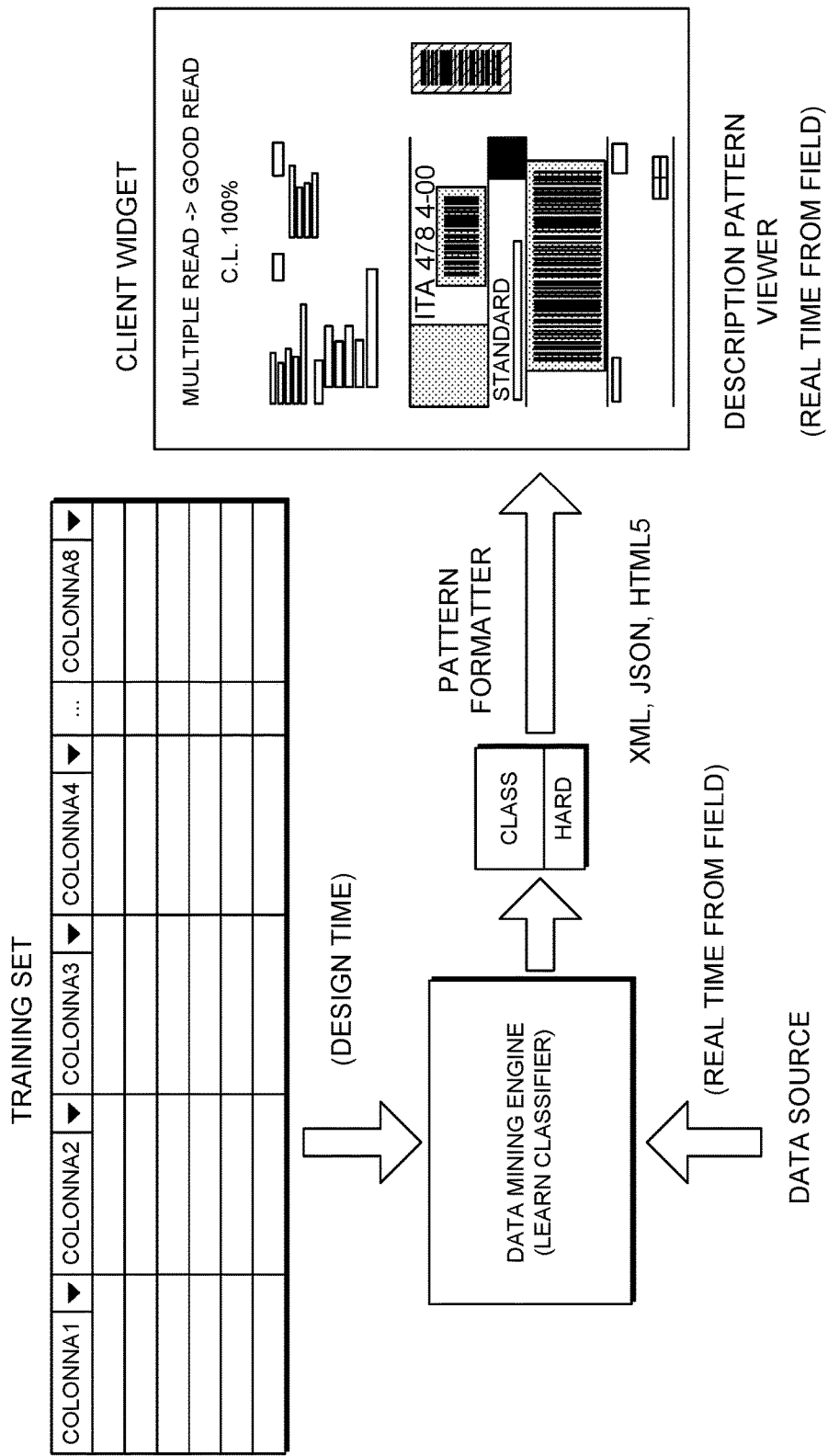
FIG. 4 is a schematic diagram showing an exemplary method in accordance with embodiments of the present invention, wherein a read and formatted label is determined with multiple reads to be a good read with a confidence indicator of 100%.

FIG. 4 illustrates a schematic diagram showing an exemplary method in accordance with embodiments of the present invention, wherein a read and formatted label is determined with multiple reads to be a good read with a confidence indicator of 100%. In comparing the label of FIG. 3 to that of FIG. 4, the right hand side shows a vertically-oriented barcode symbol that was not present in the read of FIG. 3. This may indicate that there was a symbol that was read and not expected (thus the "multiple read" condition) but, as it wasn't expected and the expected barcode symbols were still read appropriately, the confidence indicator remains 100%. It should be noted that a traditional approach would get a multiple read result, accepting the extra code (not valid for the label).

Figure 5:
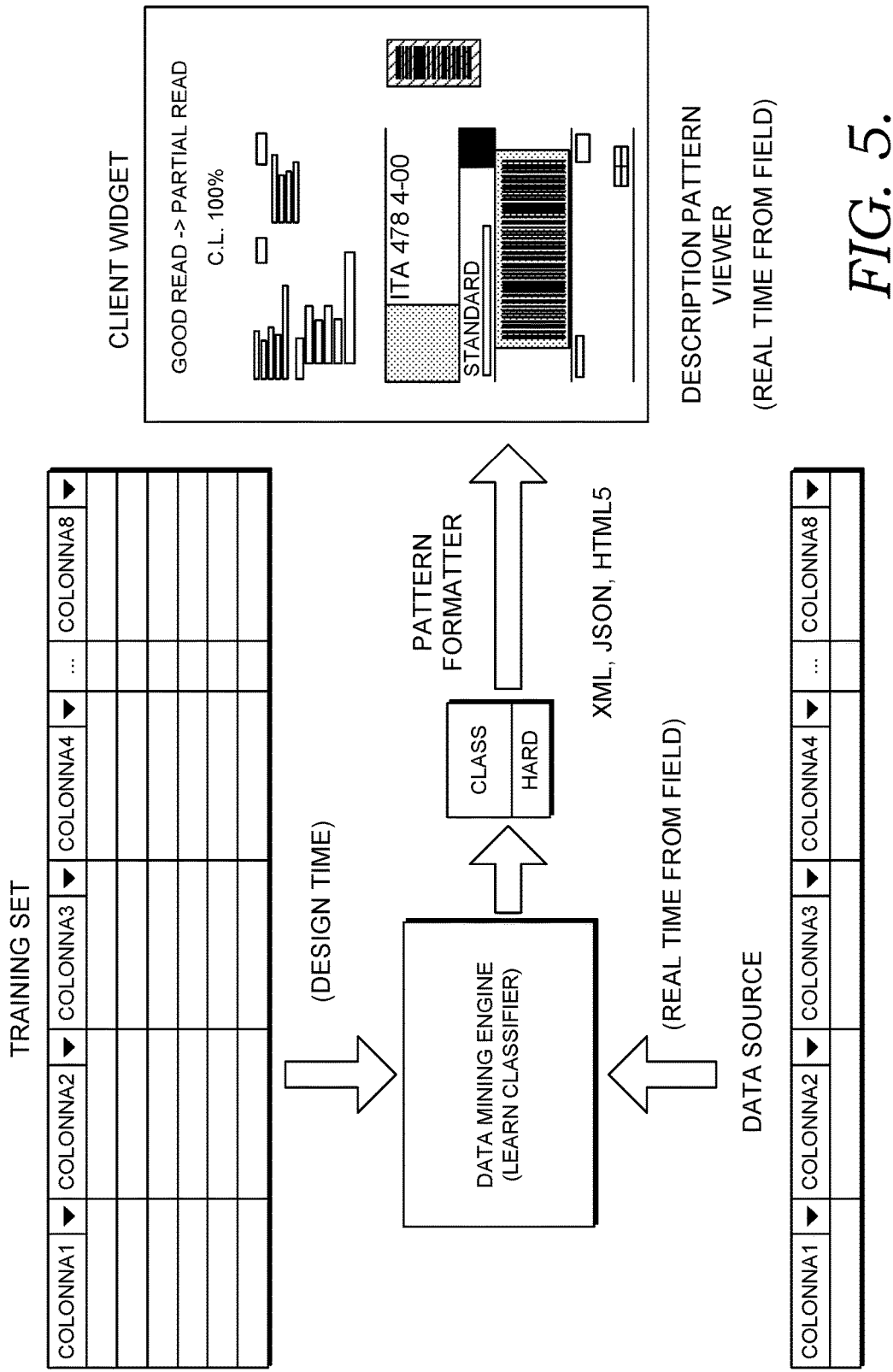
FIG. 5 is a schematic diagram showing an exemplary method in accordance with embodiments of the present invention, wherein a read and formatted label is determined with good read to be a partial read with a confidence indicator of 100%.

FIG. 5 illustrates a schematic diagram showing an exemplary method in accordance with embodiments of the present invention, wherein a read and formatted label is determined with good read to be a good, partial read with a confidence indicator of 100%. The label shown in FIG. 5 shows a missing label portion relative to the label shown in FIG. 3. This indicates that less than that which was expected was read (thus the "partial read" condition). However, enough confidence was present in what was expected, the confidence indicator remained at 100%. Note that the vertically aligned barcode symbol is still present on the right hand side of the label. This extra label is non-problematic to the confidence score, at least for the reasons discussed with respect to FIG. 4. It should be noted that a traditional approach would get a good read result, accepting the extra code (not valid for the label).

Figure 6:
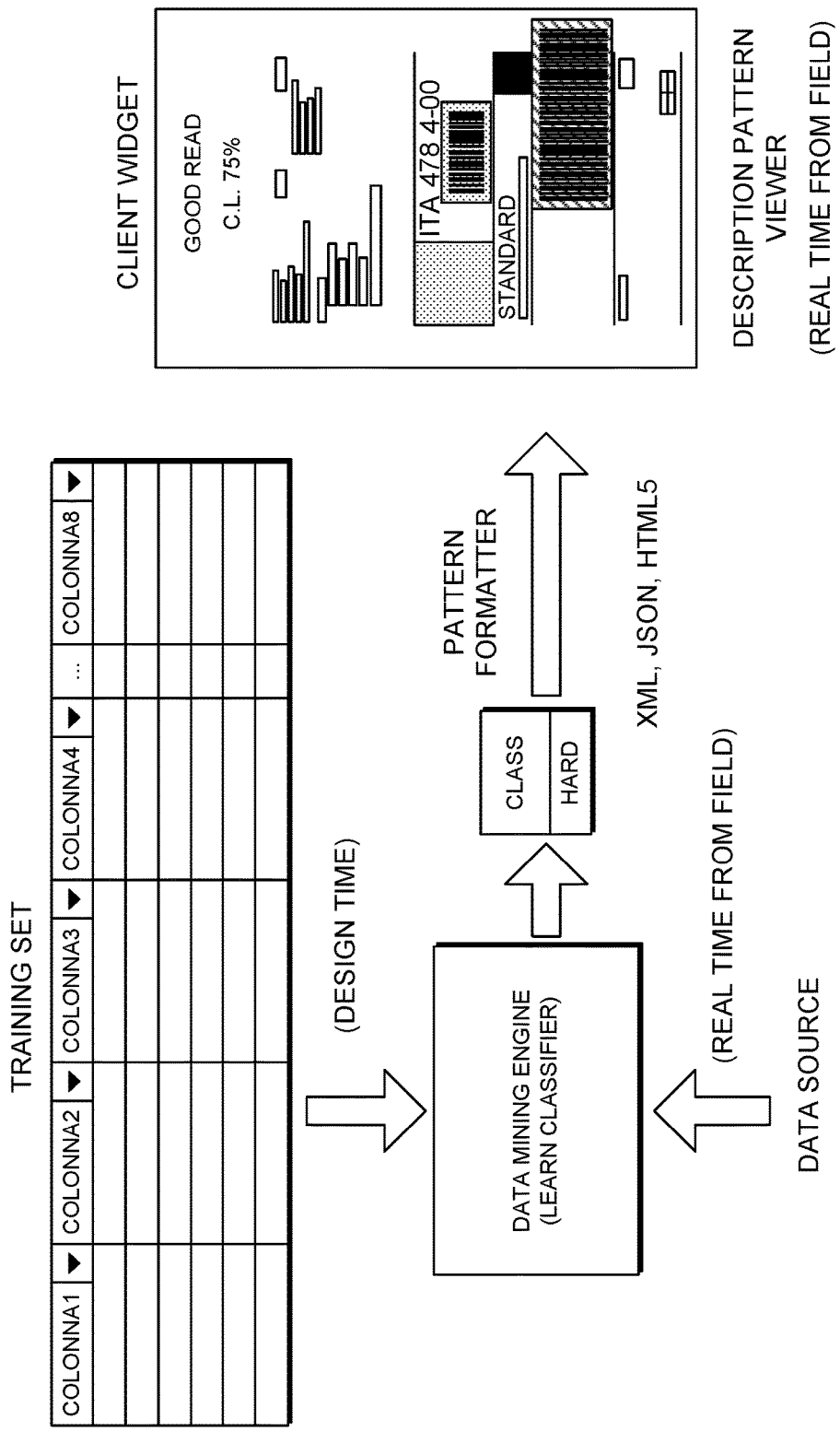
FIG. 6 is a schematic diagram showing an exemplary method in accordance with embodiments of the present invention, wherein a read and formatted label is determined to be a good read with a confidence indicator of 75%.

FIG. 6 illustrates a schematic diagram showing an exemplary method in accordance with embodiments of the present invention, wherein a read and formatted label is determined to be a good read with a confidence indicator of 75%. The label shown in FIG. 6 appears similar to that of FIG. 1 but indicates a confidence indicator of 75%. This is an instance where color-coding or other visual indicator of a read that did not proceed as expected may have decreased the confidence in the overall read. For instance, the bottom-most barcode symbol may be colored orange to indicate the read was not in the expected position (in fact, it is slightly shifted to the right) and thus the confidence in the overall label reading was affected.

Figure 7:
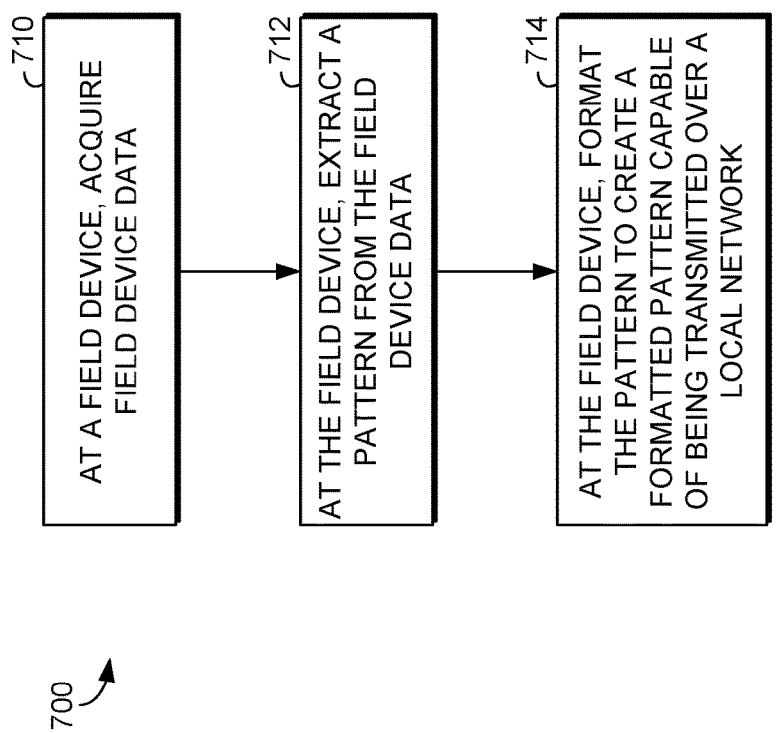
FIG. 7 is a flow diagram illustrating an exemplary method for on-field data acquisition and formatting, in accordance with exemplary embodiments of the present invention.

With reference to FIG. 7, illustrated is a flow diagram showing a method 700 for on-field data acquisition, pattern extraction, and pattern formatting, in accordance with an exemplary embodiment of the present invention. As indicated at block 710, at a field device, field device data is acquired. In exemplary embodiments, the field device may comprise an imaging sensor and the field device data may comprise imaging data. More particularly, in exemplary embodiments, the imaging sensor may comprise a barcode reader and the imaging data may comprise one or more laser-based or image-based barcode readings.

As indicated at block 712, at the field device, at least one pattern is extracted from the field device data. In embodiments, extracting the at least one pattern may comprise measuring at least one attribute pattern from the field device data; comparing the measured at least one attribute pattern to training data patterns; and based on the comparing, classifying the measured at least one attribute pattern as a predefined class-attribute pattern. In exemplary embodiments, the predefined class-attribute pattern may be a measure of a quality of the field device data from which the at least one attribute pattern is measured. More particularly, the predefined class-attribute pattern may be selected from the group consisting of a high quality pattern, a normal quality pattern, or a poor quality pattern. It will be understood and appreciated by those having ordinary skill in the art that the indicated quality-based class-attribute patterns described herein are provided by way of example only and are not intended to limit the scope of embodiments of the present invention.

In embodiments, a high quality predefined class-attribute pattern may indicate that it is easy for the field device (e.g., a barcode reader) to read particular field device data (e.g., a barcode), a poor quality predefined class-attribute pattern may indicate that it is difficult for the field device (e.g., barcode reader) to read particular field device data (e.g., a barcode), and a normal quality predefined class-attribute pattern may indicate that is neither easy nor difficult for the field device (e.g., barcode reader) to read particular field device data (e.g., a barcode).

In other exemplary embodiments, the predefined class-attribute may be a measure of a quantity of field device data points measured as a function of a quantity of field device data points expected. More particularly, the predefined class-attribute pattern may be selected from the group consisting of a complete read, a multiple read, a partial read, and a no read condition. In embodiments, the terms "easy" and "difficult" are determined relative to other sample or training field device data. It will be understood and appreciated by those having ordinary skill in the art that the indicated quantity-based class-attribute patterns described herein are provided by way of example only and are not intended to limit the scope of embodiments of the present invention.

In still further exemplary embodiments, the predefined class-attribute pattern may be indicative of a confidence indicator, that is, an indicator in the confidence of the read. In embodiments, such confidence may be expressed as a percentage.

As indicated at block 714, at the field device, the at least one pattern is formatted to create at least one formatted pattern that is capable of being transmitted over a local network. In embodiments the at least one pattern may be formatted such that the at least one formatted pattern is capable of utilizing at least one IoT middleware platform service for rendering a representation of the at least one pattern at a user device. In further embodiments, formatting the at least one pattern may comprise at least one of coding, compressing, and encrypting the at least one pattern such that the at least one formatted pattern is capable of being transmitted over the local network.

Figure 8:
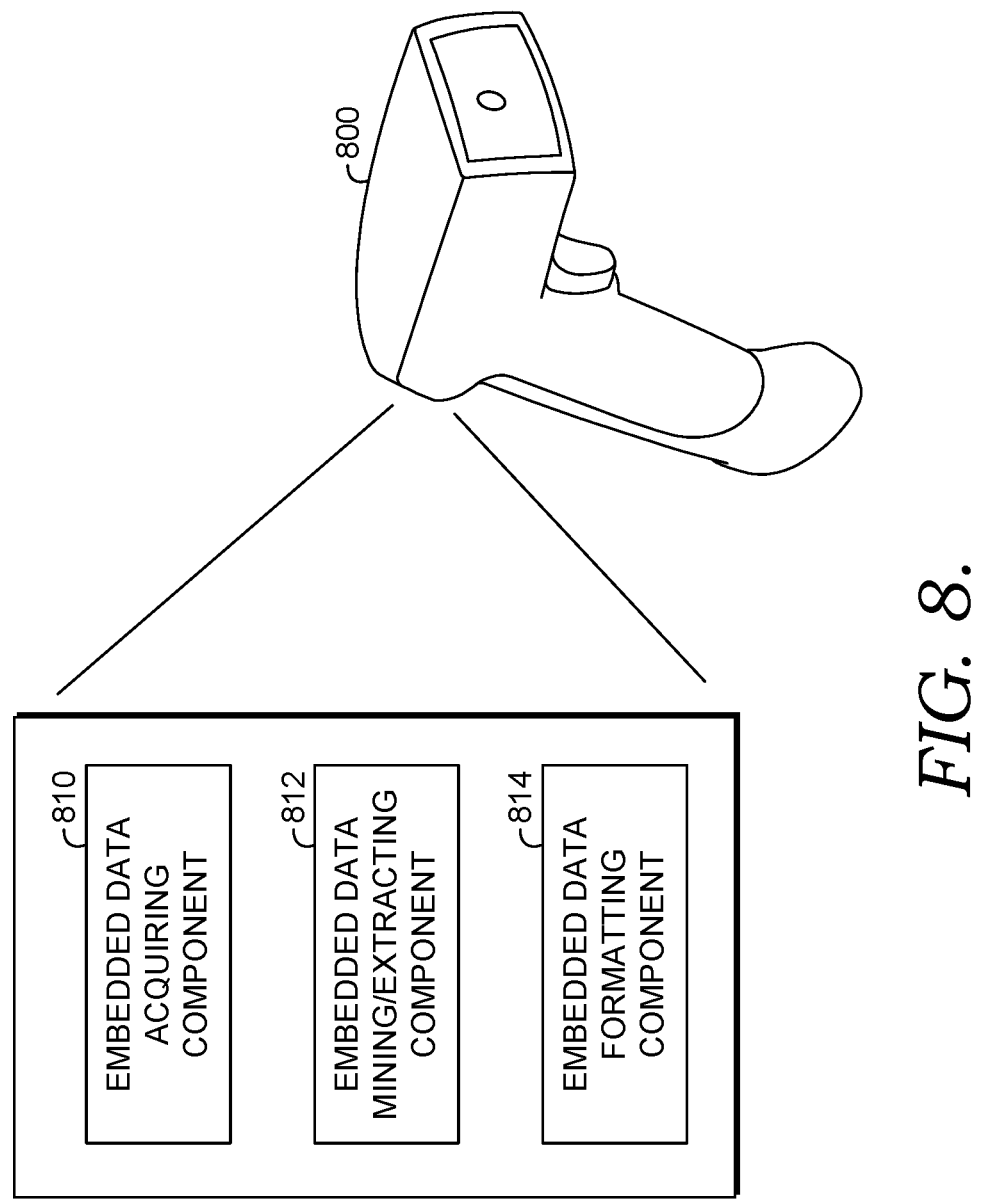
FIG. 8 is a schematic diagram illustrating an exemplary barcode reader that may be utilized in accordance with exemplary embodiments of the present invention.

With reference now to FIG. 8, illustrated is a schematic diagram showing an exemplary sensor 800 (e.g., an imaging sensor) that may be utilized in accordance with exemplary embodiments of the present invention. The sensor 800 includes an embedded data acquiring component 810, an embedded data mining/extracting component 812, and an embedded data formatting component 814. The embedded data acquiring component 810 is configured for acquiring, at the sensor (e.g., imaging sensor) 800 sensor data, for instance, imaging sensor data (e.g., barcode readings).

The embedded data mining component 812 is configured for extracting, at the sensor (e.g., imaging sensor) 800 at least one pattern from the sensor data. In embodiments, the embedded data mining component 812 is configured for extracting patterns from the sensor data by measuring at least one attribute pattern from the sensor data (e.g., imaging data), comparing the measured at least one attribute pattern to training data patterns, and based on the comparing, classifying the measured at least one attribute pattern as a predefined class-attribute pattern. In exemplary embodiments, the predefined class-attribute pattern may be a measure of a quality of the sensor data from which the at least one attribute pattern is measured. More particularly, the predefined class-attribute pattern may be selected from the group consisting of a high quality pattern, a normal quality pattern, or a poor quality pattern. It will be understood and appreciated by those having ordinary skill in the art that the indicated quality-based class-attribute patterns described herein are provided by way of example only and are not intended to limit the scope of embodiments of the present invention.

In embodiments, a high quality predefined class-attribute pattern may indicate that it is easy for the sensor (e.g., a barcode reader) to read particular sensor data (e.g., a barcode), a poor quality predefined class-attribute pattern may indicate that it is difficult for the sensor (e.g., barcode reader) to read particular sensor data (e.g., a barcode), and a normal quality predefined class-attribute pattern may indicate that is neither easy nor difficult for the sensor (e.g., barcode reader) to read particular sensor data (e.g., a barcode).

In other exemplary embodiments, the predefined class-attribute may be a measure of a quantity of sensor data points measured as a function of a quantity of sensor data points expected. More particularly, the predefined class-attribute pattern may be selected from the group consisting of a complete read, a multiple read, a partial read, and a no read condition. In embodiments, the terms "easy" and "difficult" are determined relative to other sample or training sensor data. It will be understood and appreciated by those having ordinary skill in the art that the indicated quantity-based class-attribute patterns described herein are provided by way of example only and are not intended to limit the scope of embodiments of the present invention.

In still further exemplary embodiments, the predefined class-attribute pattern may be indicative of a confidence indicator, that is, an indicator in the confidence of the read. In embodiments, such confidence may be expressed as a percentage.

The embedded data formatting component 814 is configured for, at the sensor (e.g., imaging sensor) 800 formatting the at least one pattern to create at least one formatted pattern that is capable of being transmitted over a local network. In embodiments the at least one pattern may be formatted such that the at least one formatted pattern is capable of utilizing at least one IoT middleware platform service for rendering a representation of the at least one pattern at a user device. In further embodiments, formatting the at least one pattern may comprise at least one of coding, compressing, and encrypting the at least one pattern such that the at least one formatted pattern is capable of being transmitted over the local network.

Exemplary Operating Environment

Figure 9:
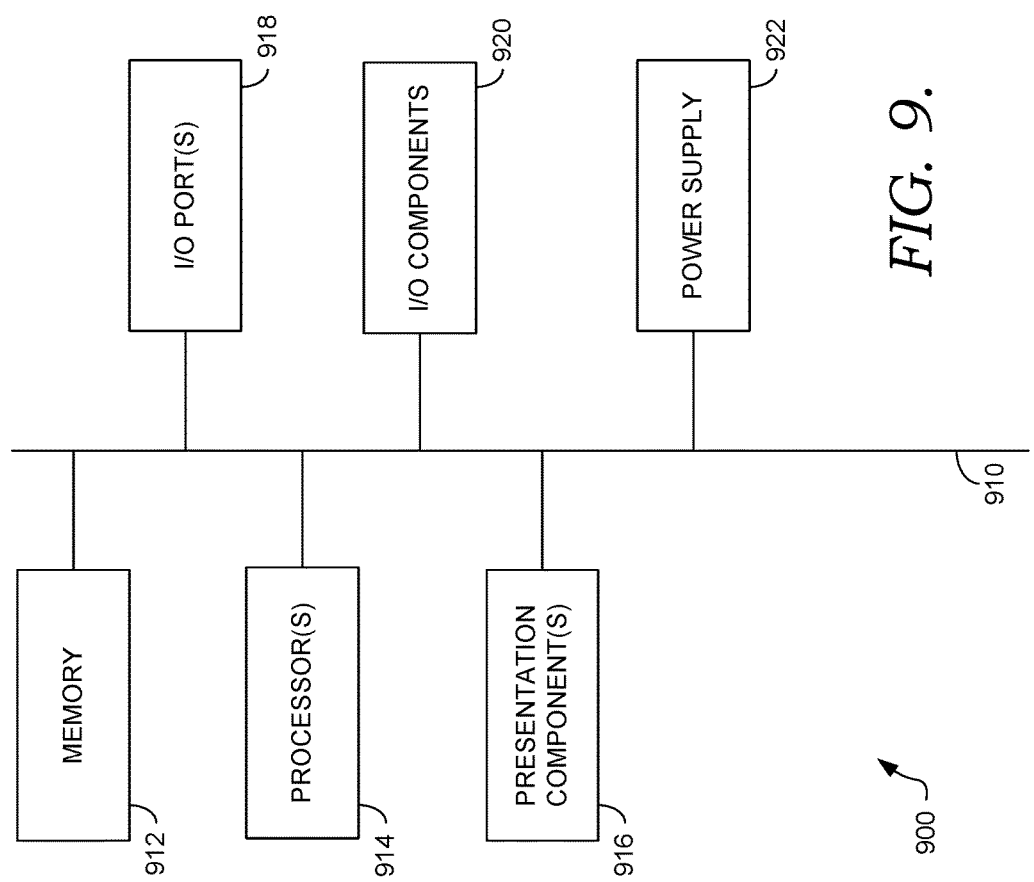
FIG. 9 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring to FIG. 9, an exemplary operating environment for implementing embodiments of the present invention is shown and designated generally as computing device 900. The computing device 900 is but one example of a suitable computing environment and is not intended to suggest any limitation as to the scope of use or functionality of embodiments of the invention. Neither should the computing device 900 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, unattended scanning systems (e.g., laser-based or image-based) consumer electronics, general-purpose computers, more specialty computing devices, and the like. Embodiments of the invention may also be practiced in distributed computing environments where tasks are performed by remote-processing devices that are linked through a communications network.

With continued reference to FIG. 9, the computing device 900 includes a bus 910 that directly or indirectly couples the following devices: a memory 912, one or more processors 914, one or more presentation components 916, one or more input/output (I/O) ports 918, one or more I/O components 920, and an illustrative power supply 922. The bus 910 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 9 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 900 typically includes a variety of computer-readable media. Computer-readable media may be any available media that is accessible by the computing device 900 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 900. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 912 includes computer-storage media in the form of volatile and/or nonvolatile memory. The memory may be removable, non-removable, or a combination thereof. Exemplary hardware devices include solid-state memory, hard drives, optical-disc drives, and the like. The computing device 900 includes one or more processors that read data from various entities such as the memory 912 or the I/O components 920. The presentation component(s) 916 present data indications to a user or other device. Exemplary presentation components include a display device, speaker, printing component, vibrating component, and the like.

The I/O ports 918 allow the computing device 900 to be logically coupled to other devices including the I/O components 920, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted, for instance, as words or symbols appearing in programs and/or apps, and the like presented by the computing device 900. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 900 may be equipped with depth cameras, such as, stereoscopic camera systems, infrared camera systems, RGB camera systems, and combinations of these for gesture detection and recognition. Additionally, the computing device 900 may be equipped with accelerometers or gyroscopes that enable detection of motion. The output of the accelerometers or gyroscopes may be provided to the display of the computing device 900 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Exemplary Features Having Multiple Dependency

As used herein and in connection with the features listed hereinafter, the terminology "any of features" or similar variations of said terminology is intended to be interpreted such that features may be combined in any combination. For example, an exemplary feature 4 may indicate the method/apparatus of any of features 1 through 3, which is intended to be interpreted such that elements of feature 1 and feature 4 may be combined, elements of feature 2 and feature 4 may be combined, elements of feature 3 and 4 may be combined, elements of features 1, 2, and 4 may be combined, elements of features 2, 3, and 4 may be combined, elements of features 1, 2, 3, and 4 may be combined, and/or other variations. Further, the terminology "any of features" or similar variations of said terminology is intended to include "any one of features" or other variations of such terminology, as indicated by some of the examples provided above.

Feature 1: A method being performed by one or more computing devices including at least one processor, the method for on-field data acquisition and formatting, and comprising: (1) acquiring, at a field device, field device data; (2) extracting, at the field device, at least one pattern from the field device data; and (3) formatting, at the field device, the at least one pattern to create at least one formatted pattern that is capable of being transmitted over a local network.

Feature 2: A method according to feature 1, wherein the field device comprises an imaging sensor, and wherein the field device data comprises imaging data.

Feature 3: A method according to feature 2, wherein the imaging sensor comprises a barcode reader, and wherein the imaging data comprises one or more barcode readings.

Feature 4: A method according to any of features 1-3, wherein extracting the at least one pattern from the field device data comprises: (1) measuring at least one attribute pattern from the field device data; (2) comparing the measured at least one attribute pattern to training data patterns; and (3) based on the comparing, classifying the measured at least one attribute pattern as a predefined class-attribute pattern.

Feature 5: A method according to feature 4, wherein the predefined class-attribute pattern is a measure of a quality of the field device data from which the at least one attribute pattern is measured.

Feature 6: A method according to feature 5, wherein the predefined class-attribute pattern is selected from the group consisting of: high quality, normal quality, and poor quality.

Feature 7: A method according to feature 6, wherein a high quality predefined class-attribute pattern indicates field device data that is easy for the field device to read, a poor quality predefined class-attribute pattern indicates field device data that is difficult for the field device to read, and wherein a normal quality predefined class-attribute pattern indicates field device data that is neither easy nor difficult for the field device to read.

Feature 8: A method according to feature 5, wherein the predefined class-attribute pattern is a measure of a quantity of field device data points measured as a function of a quantity of field device data points expected.

Feature 9: A method according to feature 8, wherein the predefined class-attribute pattern is selected from the group consisting of: a complete read, a multiple read, a partial read, and a no read.

Feature 10: A method according to feature 5, wherein the predefined class-attribute pattern is a confidence indicator.

Feature 11: A method according to any of claims 1-10, wherein formatting the at least one pattern further includes formatting the at least one pattern to create the at least one formatted pattern such that the at least one formatted pattern is capable of utilizing at least one IoT middleware platform service for rendering a representation of the at least one pattern at a user device.

Feature 12: A method according to any of claims 1-11, wherein formatting the at least one pattern comprises at least one of coding, compressing, and encrypting the at least one pattern such that the at least one formatted pattern is capable of being transmitted over the local network.

Feature 13: A sensor for on-field data acquisition and formatting, the sensor comprising: (1) an embedded data acquiring component configured for acquiring sensor data; (2) an embedded data mining component configured for extracting at least one pattern from the sensor data; and (3)

an embedded data formatting component configured for formatting the at least one pattern to create at least one formatted pattern that is capable of being transmitted over a local network.

Feature 14: A sensor according to feature 13, wherein the sensor comprises an imaging sensor, and wherein the sensor data comprises imaging data.

Feature 15: A sensor according to feature 14, wherein the imaging sensor comprises a barcode reader, and wherein the imaging data comprises one or more barcode readings.

Feature 16: A sensor according to any of features 13-15, wherein the embedded data mining component is further configured for: (1) measuring at least one attribute pattern from the sensor data; (2) comparing the measured at least one attribute pattern to training data patterns; and (3) based on the comparing, classifying the measured at least one attribute pattern as a predefined class-attribute pattern.

Feature 17: A sensor according to feature 16, wherein the predefined class-attribute pattern is a measure of a quality of the sensor data from which the at least one attribute pattern is measured.

Feature 18: A sensor according to feature 17, wherein the predefined class-attribute pattern is selected from the group consisting of: high quality, normal quality, and poor quality.

Feature 19: A sensor according to feature 18, wherein a high quality predefined class-attribute pattern indicates sensor data that is easy for the sensor to read, a poor quality predefined class-attribute pattern indicates sensor data that is difficult for the sensor to read, and wherein a normal quality predefined class-attribute pattern indicates sensor data that is neither easy nor difficult for the sensor to read.

Feature 20: A sensor according to feature 16, wherein the predefined class-attribute pattern is a measure of a quantity of sensor data points measured as a function of a quantity of sensor data points expected.

Feature 21: A sensor according to feature 20, wherein the predefined class-attribute pattern is selected from the group consisting of: a complete read, a multiple read, a partial read, and a no read.

Feature 22: A sensor according to feature 16, wherein the predefined class-attribute pattern is a confidence indicator.

Feature 23: A sensor according to any of features 13-22, wherein the embedded data formatting component is further configured for formatting the at least one pattern to create the at least one formatted pattern such that the at least one formatted pattern is capable of utilizing at least one IoT middleware platform service for rendering a representation of the at least one pattern at a user device.

Feature 24: A sensor according to any of features 13-23, wherein the embedded data formatting component formats the at least one pattern by at least one of coding, compressing, and encrypting the at least one pattern such that the at least one formatted pattern is capable of being transmitted over the local network.

Feature 25: An imaging sensor for on-field data acquisition and formatting, the imaging sensor comprising: (1) an embedded data acquiring component configured for acquiring, at the imaging sensor, a plurality of imaging data points; (2) an embedded data extracting component configured for extracting, at the imaging sensor, at least one pattern from the plurality of imaging data points by: (a) measuring at least one attribute pattern from the plurality of imaging data points; (b) comparing the measured at least one attribute pattern to a plurality of training data patterns; and (c) based on the comparing, classifying the measured at least one attribute pattern as a predefined class-attribute pattern; and (3) an embedded data formatting component configured for formatting, at the imaging sensor, the at least one classified class-attribute pattern to create at least one formatted pattern that is capable of being transmitted over a local network.

Feature 26: An imaging sensor according to feature 25, wherein the imaging sensor comprises a barcode reader, and wherein the plurality of imaging data comprises one or more barcode readings.

As can be understood, embodiments of the present invention provide systems, methods, and computer-readable storage media for, among other things, on-field acquisition, pattern extraction, and formatting of barcode reading device data. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method being performed by one or more computing devices including at least one processor, the method for on-field data acquisition and formatting, and comprising:
   acquiring, at a field device, field device data;
   extracting, at the field device, at least one pattern from the field device data by
   (1) measuring at least one attribute pattern from the field device data;
   (2) comparing the measured at least one attribute pattern to training data patterns; and
   (3) based on the comparing, classifying the measured at least one attribute pattern as a predefined class-attribute pattern; and
   formatting, at the field device, the at least one pattern to create at least one formatted pattern that is capable of being transmitted over a local network.

2. The method of claim 1, wherein the field device comprises an imaging sensor, and wherein the field device data comprises imaging data.

3. The method of claim 2, wherein the imaging sensor comprises a barcode reader, and wherein the imaging data comprises one or more barcode readings.

4. The method of claim 1, wherein the predefined class-attribute pattern is a measure of a quality of the field device data from which the at least one attribute pattern is measured.

5. The method of claim 4, wherein the predefined class-attribute pattern is selected from the group consisting of: high quality, normal quality, and poor quality.

6. The method of claim 5, wherein a high quality predefined class-attribute pattern indicates field device data that the field device is capable of reading with a first degree of difficulty, a poor quality predefined class-attribute pattern indicates field device data that the field device is capable of reading with a second degree of difficulty, and a normal quality predefined class-attribute pattern indicates field device data that the field device is capable of reading with a third degree of difficulty; and wherein the third degree of difficulty is greater than the first degree of difficulty and lesser than the second degree of difficulty.

7. The method of claim 1, wherein the predefined class-attribute pattern is a measure of a quantity of field device data points measured as a function of a quantity of field device data points expected.

8. The method of claim 7, wherein the predefined class-attribute pattern is selected from the group consisting of: a complete read, a multiple read, a partial read, and a no read.

9. The method of claim 1, wherein the predefined class-attribute pattern is a confidence indicator.

10. The method of claim 1, wherein formatting the at least one pattern further includes formatting the at least one pattern to create the at least one formatted pattern such that the at least one formatted pattern is capable of utilizing at least one IoT middleware platform service for rendering a representation of the at least one pattern at a user device.

11. The method of claim 1, wherein formatting the at least one pattern comprises at least one of coding, compressing, and encrypting the at least one pattern such that the at least one formatted pattern is capable of being transmitted over the local network.

12. A sensor for on-field data acquisition and formatting, the sensor comprising:
- an embedded data acquiring component configured for acquiring sensor data;
- an embedded data mining component configured for extracting at least one pattern from the sensor data by
  (1) measuring at least one attribute pattern from the sensor data;
  (2) comparing the measured at least one attribute pattern to training data patterns; and
  (3) based on the comparing, classifying the measured at least one attribute pattern as a predefined class-attribute pattern; and
- an embedded data formatting component configured for formatting the at least one pattern to create at least one formatted pattern that is capable of being transmitted over a local network.

13. The sensor of claim 12, wherein the sensor comprises an imaging sensor, and wherein the sensor data comprises imaging data.

14. The sensor of claim 13, wherein the imaging sensor comprises a barcode reader, and wherein the imaging data comprises one or more barcode readings.

15. The sensor of claim 12, wherein the predefined class-attribute pattern is a measure of a quality of the sensor data from which the at least one attribute pattern is measured.

16. The sensor of claim 15, wherein the predefined class-attribute pattern is selected from the group consisting of: high quality, normal quality, and poor quality.

17. The sensor of claim 16, wherein a high quality predefined class-attribute pattern indicates sensor data that the sensor is capable of reading with a first degree of difficulty, a poor quality predefined class-attribute pattern indicates sensor data that the sensor is capable of reading with a second degree of difficulty, and a normal quality predefined class-attribute pattern indicates sensor data that the sensor is capable of reading with a third degree of difficulty; and wherein the third degree of difficulty is greater than the first degree of difficulty and lesser than the second degree of difficulty.

18. The sensor of claim 12, wherein the predefined class-attribute pattern is a measure of a quantity of sensor data points measured as a function of a quantity of sensor data points expected.

19. The sensor of claim 18, wherein the predefined class-attribute pattern is selected from the group consisting of: a complete read, a multiple read, a partial read, and a no read.

20. The sensor of claim 12, wherein the predefined class-attribute pattern is a confidence indicator.

21. The sensor of claim 12, wherein the embedded data formatting component is further configured for formatting the at least one pattern to create the at least one formatted pattern such that the at least one formatted pattern is capable of utilizing at least one IoT middleware platform service for rendering a representation of the at least one pattern at a user device.

22. The sensor of claim 12, wherein the embedded data formatting component formats the at least one pattern by at least one of coding, compressing, and encrypting the at least one pattern such that the at least one formatted pattern is capable of being transmitted over the local network.

23. An imaging sensor for on-field data acquisition and formatting, the imaging sensor comprising:
- an embedded data acquiring component configured for acquiring, at the imaging sensor, a plurality of imaging data points;
- an embedded data extracting component configured for extracting, at the imaging sensor, at least one pattern from the plurality of imaging data points by:
  measuring at least one attribute pattern from the plurality of imaging data points;
  comparing the measured at least one attribute pattern to a plurality of training data patterns; and
  based on the comparing, classifying the measured at least one attribute pattern as a predefined class-attribute pattern; and
- an embedded data formatting component configured for formatting, at the imaging sensor, the at least one classified class-attribute pattern to create at least one formatted pattern that is capable of being transmitted over a local network.

24. The imaging sensor of claim 23, wherein the imaging sensor comprises a barcode reader, and wherein the plurality of imaging data comprises one or more barcode readings.

* * * * *